United States Patent [19]
Reddy et al.

[11] Patent Number: 5,634,431
[45] Date of Patent: Jun. 3, 1997

[54] ODOR INHIBITING PET LITTER

[75] Inventors: Malireddy S. Reddy, 78 Cherry Hills Farm Dr., Englewood, Colo. 80110; Elaine Sloan, Denver, Colo.

[73] Assignees: Malireddy S. Reddy, Englewood; Bentonite Corporation, Denver, both of Colo.

[21] Appl. No.: 543,566

[22] Filed: Oct. 16, 1995

Related U.S. Application Data

[63] Continuation-in-part of Ser. No. 324,896, Oct. 18, 1994, Pat. No. 5,507,250.

[51] Int. Cl.$^6$ .................................... A01K 1/015
[52] U.S. Cl. .................................... 119/173
[58] Field of Search .................................... 119/171, 172, 119/173

[56]  References Cited

U.S. PATENT DOCUMENTS

| | | |
|---|---|---|
| 3,636,927 | 1/1972 | Baum . |
| 3,789,797 | 2/1974 | Brewer . |
| 3,892,846 | 7/1975 | Wortham . |
| 3,916,831 | 11/1975 | Fisher . |
| 3,941,090 | 3/1976 | Fry . |
| 4,349,572 | 9/1982 | Larson et al. ............ 426/335 |
| 4,437,429 | 3/1984 | Goldstein . |
| 4,459,368 | 7/1984 | Jaffe et al. . |
| 4,465,019 | 8/1984 | Johnson . |
| 4,494,481 | 1/1985 | Rodriguez . |
| 4,517,919 | 5/1985 | Benjamin et al. . |
| 4,591,581 | 5/1986 | Crampton . |
| 4,607,594 | 8/1986 | Thacker . |
| 4,657,881 | 4/1987 | Crampton . |
| 4,671,208 | 6/1987 | Smith . |
| 4,685,420 | 8/1987 | Stuart . |
| 4,704,989 | 11/1987 | Rosenfeld . |
| 4,844,010 | 7/1989 | Ducharme . |
| 5,000,115 | 3/1991 | Hughes . |
| 5,094,189 | 3/1992 | Aylen et al. . |
| 5,097,799 | 3/1992 | Heitfeld et al. ............ 119/172 |
| 5,135,743 | 8/1992 | Stanislowski et al. ............ 424/76.6 |
| 5,152,250 | 10/1992 | Loeb . |
| 5,154,594 | 10/1992 | Gamlen . |
| 5,176,108 | 1/1993 | Jenkins et al. ............ 119/173 |
| 5,183,010 | 2/1993 | Raymond . |
| 5,216,980 | 6/1993 | Kiebke . |
| 5,303,676 | 4/1994 | Lawson . |
| 5,507,250 | 4/1996 | Reddy et al. ............ 119/173 |

FOREIGN PATENT DOCUMENTS

| | | |
|---|---|---|
| 86908 | 5/1959 | Denmark . |
| 39522 | 11/1981 | European Pat. Off. . |
| 76447 | 4/1983 | European Pat. Off. . |
| 1085125 | 4/1986 | Japan . |
| 3020100 | 1/1988 | Japan . |
| 3044822 | 2/1988 | Japan . |
| 2154629 | 6/1990 | Japan . |
| 1091889 | 5/1984 | U.S.S.R. . |

*Primary Examiner*—Thomas Price
*Attorney, Agent, or Firm*—Kyle W. Rost

[57]  ABSTRACT

The addition of urease negative bacteria to sodium smectite clay minerals in pet litter inhibits growth of urease positive bacteria for a period of several days, thereby retarding formation of ammonia and other obnoxious odors. Approximately fifty percent sodium bentonite in the litter causes the litter to clump upon wetting, maintaining the urea in contact with the treated clay and also serving as a buffer to favor growth of the urease negative bacteria.

19 Claims, 1 Drawing Sheet

FIG.1

ODOR INHIBITING PET LITTER

This application is a continuation-in-part of U.S. patent application Ser. No. 08/324,896, filed Oct. 18, 1994, now U.S. Pat. No. 5,507,250.

TECHNICAL FIELD

The invention generally relates to animal husbandry, especially to material for absorbing moisture from waste products. The invention discloses a clay based pet litter in which a bacterial element is mixed with certain types of clay to inhibit formation of ammonia from urea for a period of several days.

BACKGROUND ART

Household pets often are kept indoors and deposit their wastes in an absorbent composition, referred to as pet litter or cat fitter. Half a century ago, indoor pets commonly used a box of sand to receive their wastes. Since then, pet litter has evolved into a specialty market, which began with the use of industrial absorbents. Today, a suitable base material for producing pet litter is clay, which is inexpensive, absorbs liquids, and is easily disposed of, such as in the garden, or in the trash. Many clays are used as pet fitters because of their excellent absorptive qualities. Among them, attapulgite clay, which is hydrous magnesium aluminum silicate, is one of the most commonly used pet litters. Similarly, fuller's earth is a combination of attapulgite clay and bentonite clay.

Bentonite, which is a montmorillonite clay, is formed of hydrous magnesium aluminum silicate and is widely used as pet litter. Its two common forms, sodium bentonite and calcium bentonite, are distinguished by having either sodium or calcium cations. Calcium bentonite, also known as southern bentonite, is an acid activatable clay that can be treated with hydrochloric acid or sulfuric acid to significantly increase its surface area and enhance it absorptive properties. It is the better absorbent of the two. Sodium bentonite has the ability to swell several times and forms gel-like masses in water, while calcium bentonite swells much less. Sodium bentonite also is known as Wyoming or western bentonite.

Two other common pet litters are kaolin, or china clay, and sedimentary opal clay mixtures. Kaolin is a hydrous aluminum silicate of the Kaolinite mineral group, having the formula $Al_2O_3 \cdot 2SiO_2 \cdot 2H_2O$. A commercial opal clay mixture contains sedimentary opal. Opal clay contains about 20 percent more silicon dioxide than is found in bentonite and has high porosity, which provides a high absorption capacity. Both clays are commonly sold as pet litter.

The process of producing a clay based pet litter is similar with any type of clay material. Raw clay, which typically contains about 35 percent water, is mined from an open pit. Large earth movers deliver the clay to trucks, which haul it to a plant where it is dried in a kiln and crushed in several stages. During processing, different clays and other ingredients can be blended to produce a pet litter having special qualities, such as clumpability or odor control. After blending, the product granules are sorted by screening into various sizes. The final pet litter can be a mixture of sizes, which is more absorbent than when all granules are the same size.

The usefulness and performance of ordinary clay or other litter materials has been improved in three general areas. First, it has been discovered that litter is easier to keep clean if wet particles agglomerate or clump together, making it easier to remove the spent litter and waste products from the unspent litter. Second, several experimenters have added chemical or biological agents to litter in an attempt to digest the animal wastes or otherwise reduce odors. Along these same lines, litter can be scented to mask odor. Third, special litter materials have been developed that are especially absorbent. Several patents have issued in each of these areas.

The first type of patents disclose several techniques for clumping litter particles when wetted. For example, U.S. Pat. No. 5,216,980 to Kiebke combines granular clay with a gluten containing hydrophilic media. U.S. Pat. No. 5,183,010 to Raymond et al uses potato starch, gum, or polyvinyl alcohol to bind wet particles, plus boron to accelerate hardening. U.S. Pat. No. 5,152,250 to Loeb mixes granular litter with grain flour to cause agglomeration and mineral oil to cause the flour to adhere to the grains. U.S. Pat. No. 5,094,189 to Aylen et al adds potato starch to bentonite clay. U.S. Pat. No. 5,000,115 to Hughes mentions that certain natural bentonite clays, alone, are capable of clumping when wetted. U.S. Pat. No. 4,685,420 to Stuart uses a polymer in clay to form a gelled agglomerate when wetted.

These and other methods of causing spent litter to clump offer an improvement over non-clumping litter. Because only wet litter forms clumps, the spent litter and the waste contained by it can be completely removed from the litter box, while permitting unused litter to remain behind. Thus, clumping litter is efficient and economical, allowing both solid and liquid waste to be removed from the litter box without requiring that the balance of clean litter also be removed. Further, clumps are easy to remove from a litter box, which makes the cleaning job much more pleasant and raises the expectation that this job will be done more frequently. Consequently, it is expected that clumping litter results in decreased waste odor in the home, due to the frequent and complete cleanings.

The second type of patents add a chemical agent that is intended to reduce odor. For example, U.S. Pat. No. 5,303,676 to Lawson combines bentonite with sodium bicarbonate or potassium bicarbonate coated with a mixture of mineral oil and siliceous material to deodorize the litter. ZnO can be added as a bactericide. U.S. Pat. No. 4,607,594 to Thacker combines bentonite with perlite, which has been treated with carbonate, bicarbonate or hydrogen phosphate. U.S. Pat. No. 4,517,919 to Benjamin et al adds undecylenic acid, a fungicide, to bentonite or other base material. U.S. Pat. No. 4,494,481 to Rodriguez et al uses transition metal salts in the litter box to control urine odor. U.S. Pat. No. 4,459,368 to Jaffee et al mixes calcium bentonite with calcium sulfate dihydrate to control odor. U.S. Pat. No. 4,437,429 to Goldstein et al uses zeolites to control odor in bentonite. U.S. Pat. No. 3,941,090 to Fry adds cedar bound with alfalfa. U.S. Pat. No. 3,916,831 to Fisher uses popcorn as litter, with added bactericides. U.S. Pat. No. 3,892,846 to Wortham uses Al, Zn, Sn, Ca or Mg salt of an hydroxamic acid in litter to resist odor by inhibiting bacterial decomposition of urea to ammonia when wetted by urine. U.S. Pat. No. 3,789,797 to Brewer et al combines bentonite and alfalfa, which supplies chlorophyll. U.S. Pat. No. 3,636,927 to Baum adds camphane compounds, which smell like cedar oil. U.S. Pat. No. 4,844,010 to Ducharme et al uses cyclodextrin in clay to absorb nitrogenous compounds. U.S. Pat. No. 4,704,989 to Rosenfeld adds absorptive materials to clay litter, deodorizers and bactericides. U.S. Pat. No. 4,671,208 to Smith adds limestone to litter to neutralize urine and raise pH. U.S. Pat. No. 4,465,019 to Johnson adds dried citrus pulp to litter. Japan Pat. No. 3044-822 discloses an animal litter composed of clay and a water insoluble chemical deodorant, which may be an organic acid and its salt. Japan 3020-100 discloses use of bentonite, zeolite, or cristobalite plus deodorizer. EPO Publication 76,447 reduces ammonia content of air in animal stalls by lowering pH, through addition of a mixture of urea phosphate, phosphoric acid, sulfuric acid or alkali metal hydrogen sulphate and an organic acid. The low pH suppresses pathogenic bacteria by encouraging growth of acidophilic organisms such as lactobacilli, increasing lactic acid content. EPO Publication 39,522 manufactures litter from cellulosic fibers, pelletized, with added fungicides and bactericides.

These chemical agents may achieve success, although it appears that some could be expensive and others might require large concentrations to effectively treat any significant volume of animal wastes. Some of the chemicals might cause environmental problems, especially if allowed to build up by disposal in a dump site or garden over a long period of time. For this reason, alone, the use of deodorizers, bactericides, fungicides, acids, metal salts, and perhaps other similar materials appears to be a poor choice. In addition, pets walk through the litter box. Thus, these chemicals will be in contact with the pet's feet for substantial periods of time, which might cause irritation or other health problems. As pets groom themselves, the chemicals may in ingested. Further, the pet may track these chemicals through all areas of the house, spreading potential problems to human inhabitants, as well.

A few patents have attempted to use biologic agents to reduce odors. For example, U.S. Pat. No. 5,154,594 to Gamlen combines clay with digestive bacteria to break down the waste. Japan Pat. No. 2154-629 combines multiple types of bacteria on a sawdust growth medium to break down ammonia, which is a bacterial decomposition product and major odor component, and other excrement and thereby prevent odor. Japan Pat. No. 1085-125 discloses the combination of sawdust and thermophilic bacteria on the floor of a cattle shed to control odor. The mixture is placed in a compost shed for several weeks to produce mature compost. Soviet Union 1,091,889 discloses an animal bedding made of composted manure. Thermophilic bacteria in the manure cause an increased temperature that kills disease microorganisms. After composting, the manure is reused as bedding. Denmark Patent 86,908 combines cellulose and coccidium-retarding agent plus a protein rich material. These biologic agent patents seem unlikely to be completely successful, since composting or digesting wastes produces odors.

The third type of patent, in which absorbency is increased, is represented by U.S. Pat. No. 4,657,881 to Crampton, which makes highly absorptive cat litter from clay times that are compacted and then broken into larger particles. Absorbency is increased by adding an antideposition agent, which might include Wyoming bentonite, which is known to form a gel when wetted. The content of U.S. Pat. No. 4,591,581 to Crampton is similar. Improving absorbency would be expected to make a litter more efficient, since liquid wastes might be captured in the granular material rather than being allowed to pool at the bottom of the litter box.

These many approaches to improved handling of animal wastes demonstrate that controlling odor of animal wastes is long standing problem. Some of the approaches deal with specialized problems that are unlikely to be reproduced with home litter boxes. For example, those treatments directed to cattle barns are dealing with cellulose based wastes, since cattle are herbivores. In contrast, home pets like dogs and cats consume a mostly protein diet and their wastes tend to be far more putrid. Those techniques that claim to digest wastes are unlikely to be a full household cure, since the digestion process itself produces ammonia, which is a source of strong obnoxious odor from wastes. Thus, it appears a household litter that is odor free or at least can delay significant odor formation for a substantial time period is yet to be developed.

It would be desirable to have a litter or a treatment for litter that prevents formation of odor causing substances. Digestive schemes alone are unlikely to prevent odor, since digestion produces odor if only for a short time.

Further, it would be desirable to have a litter that can prevent formation of obnoxious odor without requiring an added fragrance to mask various odors that ordinarily develop. The addition of a fragrance to litter, for the purpose of covering bad odors, often is not a satisfactory solution since the odor continues to exist in the background of the fragrance. Of course, animal wastes have an immediate odor that a mild fragrance might cover. It is subsequently developed odors, such as ammonia, that tend to be most obnoxious and permeating. These are the odors that are most important to prevent.

Similarly, it would be desirable to have a litter or a treatment for litter that prevents formation of odors for at least a full day and preferably longer. Even the most attentive pet owner can be delayed from promptly emptying a used litter box. Ordinarily, the odors from a used litter box become obnoxious quite soon after the use and soon can permeate a house. Therefore, if these odors are substantially eliminated for one or two days, or more, the ambience of the house is greatly improved.

Moreover, it would be desirable to combine an odor free litter or treatment for litter with a clumping litter, both to simplify emptying the spent portion of litter from the litter box and to maintain the waste in contact with the treated litter for effective odor prevention.

Another desirable goal is to control or suppress odor while using only a small amount of active agent. The chemical or biological treatments known in the prior art might involve prohibitive expense. Further, it would be undesirable to add significant quantities of any sort of agent to established litters such that they might change the character of the litter material, resulting in the agent being tracked about the house on the pet's feet.

To achieve the foregoing and other objects and in accordance with the purpose of the present invention, as embodied and broadly described herein, the product and method of this invention may comprise the following.

DISCLOSURE OF INVENTION

Against the described background, it is therefore a general object of the invention to provide an improved odor inhibiting animal absorbent or treatment of animal absorbents suited for use in home litter boxes, in which animal wastes are prevented from producing obnoxious odors.

A more specific object is to provide an animal absorbent that can delay odor formation for at least one day and preferably longer, after the waste contacts the absorbent.

Another object is to provide an odor inhibiting animal absorbent that can work in combination with a clumping litter, so that the absorbent and the animal wastes are maintained in operative contact.

A further object is to create a deodorized animal absorbent that is safe for use in a litter box, with respect to both the pet and humans in the house.

Still another object is to provide a deodorizing treatment for pet litter that requires very little additive or treating agent. A low concentration of additive or treating agent is desirable to make the treatment affordable and prevent the pet from tracking the additive or agent.

Additional objects, advantages and novel features of the invention shall be set forth in part in the description that follows, and in part will become apparent to those skilled in the art upon examination of the following or may be learned by the practice of the invention. The object and the advantages of the invention may be realized and attained by means of the instrumentalities and in combinations particularly pointed out in the appended claims.

According to the invention, an odor retarding pet litter is formed of an absorbent composition and a urease negative bacterial culture combined with the absorbent composition, in an effective amount to inhibit growth of urease positive bacteria when, in use, the absorbent composition is wetted with animal waste containing urea.

According to another aspect of the invention a method of suppressing production of odor in pet litter is achieved by applying to a pet litter an effective amount of a urease negative bacteria.

The accompanying drawing, which is incorporated in and forms a part of the specification illustrates the performance of a preferred embodiment of the present invention, and together with the description, serves to explain the principles of the invention. In the drawing:

BEST MODE FOR CARRYING OUT THE INVENTION

The invention is an odor inhibiting pet litter, a method of treating pet litter materials to achieve odor inhibition, and a litter box containing the treated pet litter material. The products and methods of this application are based upon use of a urease negative organism that delays decomposition of solid and liquid animal wastes, with the result that ammonia is not formed and released with the typical frequency of such wastes decomposing in nature. Ammonia is believed to be the chief cause of obnoxious odors from liquid animal wastes aging in a litter box. During the period of prevention or delay, the urease negative organism effectively prevents formation of obnoxious odor. Organisms of this type are effective in low concentrations against the volumes of waste typically deposited in a litter box. In addition, such organisms are not harmful to animals or humans.

In another aspect, the invention is an interactive system of urease negative organisms and buffer means. When the system is subjected to wastes, such as acidic urine, it maintains pH in a range favoring the organism. The buffer means may be the pet litter material, itself, especially when the litter material is a smectite (swelling) clay, such as sodium bentonite. The preferred pH range is basic, especially around pH 7–9.

A further aspect of the invention is the interaction of the organism with clumping pet litter materials. Numerous clumping pet litters are known in the art, including some that occur naturally and others that are manmade. A preferred clumping litter is formed of a substantial concentration of sodium bentonite, which is naturally occurring and inherently gels or clumps when wet. When used with other clays or pet litter materials, the concentration of sodium bentonite must be at least about fifty percent to realize the natural clumping action. Because sodium bentonite is a natural clumping material and also is a suitable buffer, this single material is a preferred choice. Further considerations are that sodium bentonite is plentiful, inexpensive, and already has been used as pet litter for many decades. It can be safely disposed of in compost, in the garden, or in the trash.

Smectite clays are a group of minerals composed of units made up of two silica tetrahedral sheets with a central alumina octahedral sheet. Exchangeable cations are found between the silicate layers. The layers are stacked with oxygen atoms from each layer being disposed in a common intermediate layer. The bonding between adjacent oxygen atoms in the central layer is weak and results in cleavage between the units. Polar molecules such as water can enter between units and expand the lattice structure. Thus, the smectite clays are swell easily in the presence of water or other polar molecules. Some examples of smectites are the dioctahedral smectites: montmorillonite, beidellite, and nontronite; and the trioctahedral smectites: hectorite and saponite.

A number of urease negative organisms are known and are suitable for use in a litter product. Among them are strains selected from group N streptococcus, such as lactococcus lactis ssp. lactis, lactococcus lactis ssp. cremoris, and lactococcus lactis ssp. lactis bio var diacetylactis; group D streptococcus, such as streptococcus faecium; pediococcus such as pediococcus acidilactici, pediococcus cerevisiae, and pediococcus pentosaeceus; propionibaeterium such as propionibacterium shermanii and propionibacterium freudenreichii; leuconostoc such as leuconostoc mesenteroides ssp. cremoris and leuconostoc mesenteroides ssp. dextranicum; and lactobacillus such as lactobacillus acidophilus and lactobacillus bulgaricus. Other nonspecific bacillus type organisms of compost and soil origin also are candidates.

Urease negative strains belonging to the genus lactococcus, streptococcus, pediococcus, propionibacterium, leuconostoc, lactobacillus, and nonspecific unidentified bacillus type urease negative organisms of compost and soil origin were propagated in sterile nutrient medium. The cultures were transferred thrice to activate the cellular metabolism. A sterilized 12% solids medium was prepared by heating it to 170° F. to 190° F., holding for 45 minutes to 1 hour, and cooling to 90° F. The organisms were inoculated into this 12% solids medium. The amount of inoculum used was one percent. The cultures were incubated and neutralized at specific intervals to maximize the cell population. At the end of the growth period, the cultures were cooled to 40° to 50° F. Then all the liquid cultures were blended and mixed with dry base consisting of vegetable flour, carbohydrates, vegetable gum, and sodium montmorillonite. After it is mixed, the entire doughy mass is extruded cold and dried at room temperature. Notably, this preparation includes the spent growth medium and byproducts of growth, such as bacterial enzymes and other beneficial by-products. The culture preparation thus prepared is mixed with the smectite clay, such as sodium montmorillonite, to prepare a pet litter. An alternative preparation is to apply the liquid culture preparation, after growth stage, by spraying it on the smectite clay or other pet litter blend, including swelling smectite clays such as sodium montmorillonite.

In the course of conducting these studies, it was discovered that the stimulant, yucca schidigera extract, had an exceptional stimulatory effect on the urease negative bacteria, especially on propionibacterium species. This result was determined using direct microscopic examination.

However, even urease negative bacteria cultures grown in growth medium without yucca schidigera extract exhibited odor inhibition in pet litter. A control medium without any bacteria, but with yucca schidigera extract, even when used at high concentration, could not inhibit odor in pet litter. Urease negative bacteria grown in the presence of yucca schidigera extract exhibited significantly better ability to inhibit odor in pet litter, as compared to urease negative bacteria grown without this stimulant. Possibly the exceptional growth of bacteria in the presence of yucca schidigera extract leads to production of significantly different bacterial by-products. When the relative quantities of other ingredients in the growth media were varied, no similar advantage was found.

The term "treated litter" and the like will be used throughout to refer to pet litter of any description to which urease negative organisms have been applied, unless context indicates otherwise.

The term, "untreated litter" and the like will be used throughout to refer to pet litter of any description to which urease negative organisms have not been applied, unless context indicates otherwise.

The terms, "beneficial organisms," "beneficial culture" or the like, refer to urease negative bacteria or cultures of same, unless context indicates otherwise.

The terms, "culture preparation," "bacterial preparation," "bacterial enzyme culture additive" or the like refer to a urease negative bacteria in combination with spent growth medium and growth by-products, such as enzymes and, optionally depending on context, solidifying and bulking agents, unless context indicates otherwise.

EXAMPLE 1

A culture preparation for application to pet litter is prepared by first formulating a basic nutrient medium. Suitable ingredients include a protein source, such as sweet whey, casein hydrolyzate, and autolyzed yeast extract; a carbohydrate source, such as dextrose; buffers, such as disodium phosphate, monosodium phosphate, and sodium and bicarbonate; stimulants, such as powdered yucca schidigera extract; and water. A 100 lb. mixture of medium is prepared from the following ingredients, expressed as weight percent.

TABLE 1

| Ingredient | Percentage | Typical Range | Preferred Range |
| --- | --- | --- | --- |
| Sweet Whey | 63.0 | 50–75 | 60–65 |
| Autolyzed Yeast Extract | 5.0 | 2.5–7.5 | 3–5 |
| Dextrose | 20.0 | 10–30 | 15–25 |
| Disodium Phosphate | 1.5 | 1–3 | 1.25–2.75 |
| Monosodium Phosphate | 3.0 | 2–5 | 2.5–4.0 |
| Casein Hydrolyzate | 5.0 | 2.5–7.5 | 3–5 |
| Powdered Yucca Schidigera Extract | 0.50 | 0.05–2.5 | 0.25–0.75 |
| Sodium Bicarbonate | 2.0 | 1–5 | 1.5–3 |

The ingredients are thoroughly blended and may be stored in dry form until ready for use.

A liquid culture is prepared by reconstituting the medium at the rate of 12% solids by weight in warm water. Next, using acid or base neutralizer, pH is adjusted to 6.8 to 7.0. The medium is heated with constant agitation to 190° F. and held at that temperature for 40–45 minutes. Then the medium is cooled to 90° F. and inoculated with individual urease negative strains of lactococcus lactis ssp. cremoris, lactococcus lactis ssp. lactis, lactococcus lactis ssp. lactis bio var diacetylactis, pediococcus cerevisiae, pediococcus acidilactici, pediococcus pentosaeceus, streptococcus faecium, propionibacterium shermanii, propionibacterium freudenreichii, leuconostoc mesenteroides ssp. cremoris, leuconostoc mesenteroides ssp. dextranicum, lactobacillus acidophilus, lactobacillus bulgaricus, and non specific urease negative compost and soil origin, unidentified mixed flora. The organisms are allowed to grow until pH drops to 5.8. Then, the cultures are neutralized to pH 6.2 using an alkaline neutralizer such as sodium hydroxide, potassium hydroxide, or ammonium hydroxide. The process is continued, often ten to fifteen times, until the pH no longer drops below pH 5.8. At this stage, most of the nutrients are exhausted, and a sufficient population is established in the medium. The live cell count concentration at this stage is approximately 2 to 5 billion organisms per gram.

Next, the medium is cooled to 50° F. by circulating cold water through cooling tubes. The fully grown liquid culture is blended in a separate vessel with dried vegetable flours or vegetable flour and bentonite or other suitable dry material to bring it to a doughy consistency, thereby producing a culture preparation. The culture preparation is extruded, dried, and milled to the consistency of granules or fine, 200 mesh powder.

The dried bacterial preparation is blended with smectite clay or other suitable granular absorbent to form a treated pet litter. The dried bacterial preparation can be supplied as an independent additive, to be mixed with any selected pet litter, such as by a pet owner or pet litter supplier. Similarly, the bacterial preparation can be mixed with a suitable absorbent material and supplied as a treated pet litter product. It is similarly possible to offer a treated pet litter in a package that also serves as a litter box.

These organisms have been tested individually and in combinations at the rate of 0.1% to 5% by weight in sodium bentonite. In a preliminary qualitative test, 300 gm samples of treated litter were prepared. Cat urine, from veterinary supply sources, was added to each sample, and the samples were allowed to sit at room temperature for a period of three weeks. Equivalent control samples consisted of untreated bentonite. A three member panel evaluated odor of all aged samples. The result was that the samples treated with urease negative bacteria had less odor than the control samples. Samples using a combination of two species of urease negative bacteria showed still lower odor. Samples treated with urease positive bacteria were found to have powerful odor, stronger than the control samples.

Based upon this preliminary showing of efficacy, further tests were run to determine field efficacy and acceptance by animals and humans. All tests were conducted using the culture prepared according to Example 1.

EXAMPLE 2

Qualitative efficacy tests were conducted. A seven to ten day test of animal absorbents, with and without the beneficial culture, was run in households having cats. Sample A was ordinary sodium bentonite cat litter; Sample B was sodium bentonite treated with 1% by weight of a culture preparation of beneficial organisms, as prepared in Example 1. This high level of a preparation of these organisms was used to determine whether high levels would be accepted by cats. Seven households returned bags of cat wastes removed from litter boxes of each sample. All cats used both samples, showing that litter containing the culture preparation was accepted. Based on weights of the returned bags of wastes, most of the cats preferred B.

TABLE 2

CAT DROSS COLLECTION DATA

| WEIGHT SAMPLE A (lbs.) | WEIGHT SAMPLE B (lbs.) | NUMBER OF CATS | PREFER |
| --- | --- | --- | --- |
| 3.6 | 4.0 | 2 | B |
| 0.8 | 1.1 | 1 | B |
| 2.4 | 6.0 | 3 | B |
| 1.3 | 1.5 | 1 | B |
| 0.8 | 1.3 | 2 | B |
| 3.8 | 5.1 | 3 | A |
| 3.8 | 4.0 | 2 | A |
| TOTAL: 18.0 | 21.5 | 14 | — |

Further tests were conducted on the urine soaked clumps from the waste collection bags:

ODOR TEST: Samples A and B each consisted of a collection of variously aged specimens, ranging from 0–10 days old. Each collection was kept in a bucket, and the odor from the bucket was evaluated in gross. The urine clumps of Sample A were pungent, repulsive, and ammoniacal. The urine clumps of Sample B had a mild fermentative, non-repulsive odor. This result shows field efficacy.

CLUMPABILITY TEST: At the time of collection, clumps from both Sample A and Sample B were cohesive and non-friable when collected daily. The aged clumps were different. Clumps from Sample A were cohesive and non-friable; clumps from Sample B were slightly less cohesive and slightly more friable. This result shows that a reaction occurred, induced by the beneficial cultures.

AMMONIA TEST: The more aged specimens from Samples A and B were evaluated for ammonia content. Clumps weighing 30 grams were placed in petri dishes and 30 ml of hydrogen peroxide solution was added to each. The peroxide solutions from Sample A fitter frothed vigorously. The peroxide solutions from sample B litters did not froth. This suggests that ammonia was present in Sample A clumps but not in Sample B. Either the urea in Sample B was freed and did not form ammonia, or, if ammonia was formed, it was utilized by the beneficial cultures. This test was confirmed by using pure ammonia and pure urea. The ammonia samples frothed in the presence of peroxide, while the urea sample did not, indicating that it was the ammonia in Sample A that caused frothing.

NON-CLUMPING LITTER TEST: A one week test was run, with and without the beneficial organisms, on a commercially available non-clumping litter to determine the efficacy of the treatment in situations where urine could run through the litter and pool at the bottom of the litter box. Sample C was untreated and Sample D contained 1% by weight of a culture preparation of beneficial organisms. After three cats had used the samples for one week, urine odor from Sample C was notably stronger than that from Sample D. This result indicates that the beneficial organisms are useful with non-clumping litters.

CONCENTRATION TEST: Sample E was prepared by mixing ten pounds of sodium bentonite litter with five pounds of Sample B, producing a 0.33% concentration of a culture preparation of beneficial organisms. The odor of Sample E was substantially reduced as compared to the odor of Sample A.

AGING TEST: The ammonia test was performed on both fresh and aged, treated litter.

a. Fresh: Very fresh urine clumps—less than 8 hours old—were taken from three different litter boxes. Sample A, Sample B, and Sample E. The ammonia test was performed. No foaming was observed in any sample, indicating that urea had not yet converted to ammonia.

b. Aged: An ammonia test was run on a one week old clump from the Sample E litter box. The sample bubbled vigorously indicating that urea had converted to ammonia. This result demonstrates that urea fixation is stable for less than one week. Eventual breakdown is valuable in converting wastes to usable fertilizer.

CONTROL TEST:

a. Beneficial Organisms: The ammonia test was run on 100% culture preparation of beneficial organisms. Only an occasional bubble was observed, indicating that the culture preparation alone does not interfere with the foaming/nonfoaming test results.

b. Urine: The ammonia test was run on a fresh sample of human urine. No foaming resulted. This indicates that nitrogen is present as urea and later changed to ammonia.

FECAL MATTER TEST: The ammonia test was run on fresh, less that 8 hours old fecal matter from Sample A and Sample B litter boxes. Sample A foamed vigorously with a brown foam. Sample B had a few tiny bubbles and no foaming. This indicates that the beneficial organisms are retarding the formation of odor causing nitrogenous compounds in cat feces, helping with odor control.

It is generally known that the primary odor causing component in cat urine is ammonia, formed by the breakdown of the urea in fresh cat urine. The odor in cat feces is from skatole and indole. In order to track the formation, growth, and disappearance of these and other compounds, cat urine and feces from Sample A and Sample B, as well as the culture, itself, and both the treated and untreated sodium bentonite, itself, were tested with sensitive instruments. It was found that skatole and indole were not detectable by the instruments at the levels found in litter boxes. Apparently, the concentration of these compounds was too low for analytical detection. Thus, no quantitative tests could be conducted on these compounds. Instrumental analysis is useful within concentration limits measured in parts per million. However, the human nose appears able to detect certain odors in concentrations of parts per billion. Qualitative tests, using the human nose, showed that litter treated with beneficial organisms was effective in reducing odors of skatole and indole.

EXAMPLE 3

The following samples were evaluated:

Sample A—untreated Na Bentonite litter.

"A" Urine—from untreated Sample A one day old.

"B" Urine—from treated Sample B one day old.

The determination of ammonia by Potentiometric, Ion Selective Electrode was performed according to EPA Method 350.3—1974. Approximately 25 grams of the sample was broken up and placed onto a fritted glass funnel. The sample was placed in a closed system and purged with nitrogen at fifty milliliters per minute for twenty minutes. The gas was purged through 110 ml of slightly acidic deionized water which was then tested for ammonia with EPA Method 350.3

TABLE 3

| QUANTITATIVE TEST FOR AMMONIA | |
|---|---|
| SAMPLE ID | CONCENTRATION OF AMMONIA |
| Sample A - litter only | 0.017 mg/L |
| "B" Urine - treated | 0.026 mg/L |
| "A" Urine - untreated | 0.087 mg/L |

Reliable detection limit for this method is 0.05 mg/L.

The EPA Method 350.3 analysis indicated a difference in the ammonia concentration observed in the samples. Measurements of ammonia level in the blank litter and in the urine from the treated litter were below the reliable detection limit of the instrument, which could introduce inaccuracy in the reported levels of ammonia. Nevertheless, the results indicated a quantitative difference. The untreated urine showed an increasing ammonia concentration in a 25 gram sample.

EXAMPLE 4

Blank specimens of both Sample A, untreated blank litter, and Sample B, treated blank litter, were evaluated as controls. To determine quantitative performance of the culture, progressively aged urine samples from both batches of litter were evaluated on a day-to-day aging basis over an elapsed period of two weeks. The freshest samples were less than 8 hours old, having been taken on the day of the test. Further samples were aged each day from two to six days. Two samples from each group were allowed to age eight more days and were tested when they reached 12 and 14 days aging.

The determination of ammonia by Potentiometric, Ion Selective Electrode was performed according to EPA Method 350.3—1974. Approximately 40 grams of the sample was broken up and placed onto a fritted glass funnel. The sample was placed in a closed system and purged with nitrogen at fifty milliliters per minute for twenty minutes. The gas was purged through 50 ml of slight acidic Nano-pure water which was then tested for ammonia with EPA Method 350.3.

TABLE 4

| QUANTITATIVE TEST FOR AMMONIA | | | |
|---|---|---|---|
| SAMPLE B - TREATED | $NH_3$ µg/g | SAMPLE A - UNTREATED | $NH_3$ µg/g |
| Control | 0.01 | Control | 0.02 |
| Day 1 | 0.36 | Day 1 | 3.61 |
| Day 2 | 0.26 | Day 2 | 4.77 |
| Day 3 | 11.6 | Day 3 | 1.83 |
| Day 4 | 4.77 | Day 4 | 136.0 |
| Day 5 | 186.0 | Day 5 | 641.0 |
| Day 6 | 7.23 | Day 6 | 1,777 |
| Day 12 | 1,890 | Day 12 | 2,847 |
| Day 14 | 2,320 | Day 14 | 2,435 |

Figure 1:
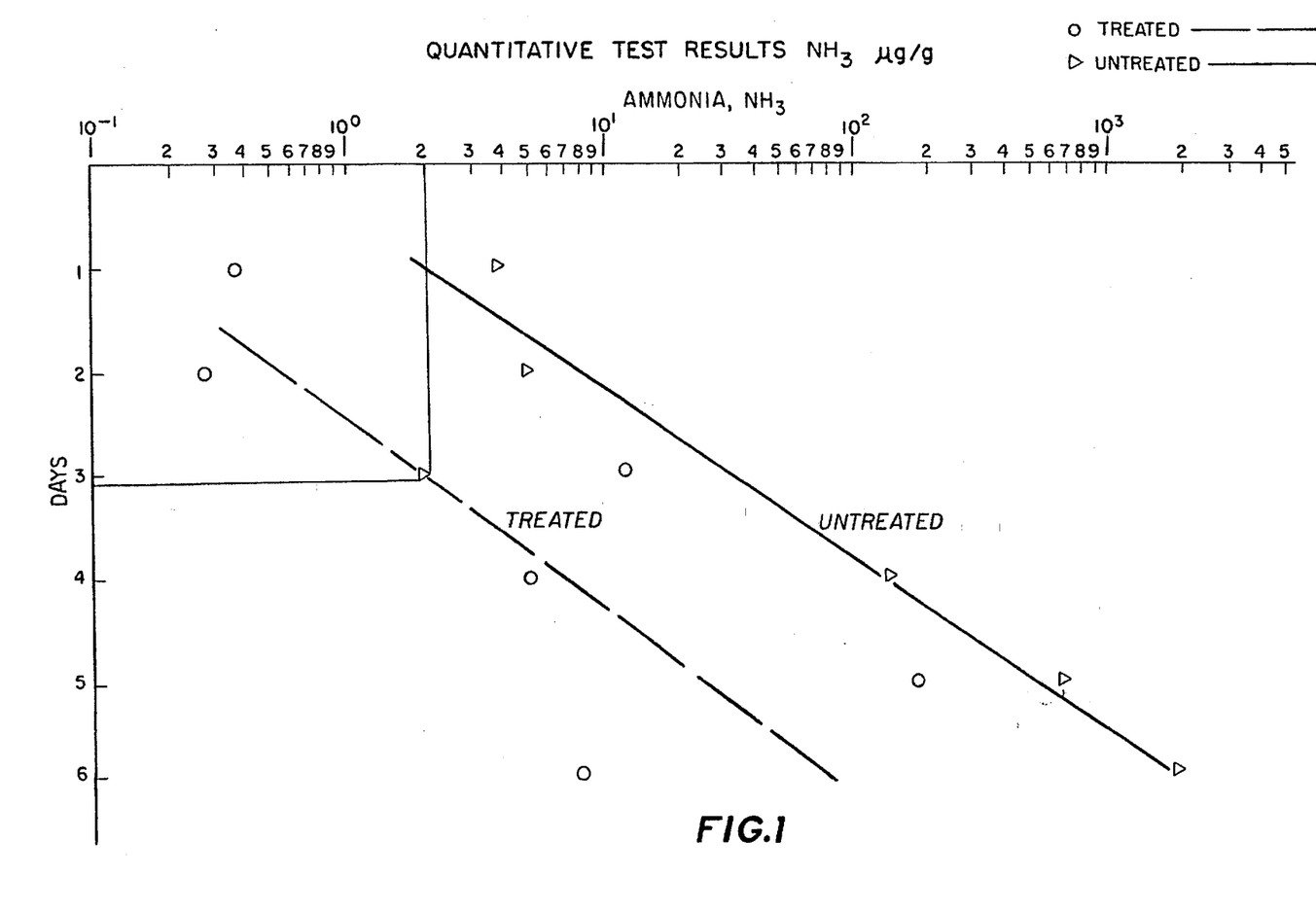
FIG. 1 is a graph showing ammonia content of spent pet litter over time, comparing litter treated according to this invention with untreated litter.

The data for the first six days was placed on a graph and a line of best fit was drawn for both treated and untreated samples. The graph shows a difference in the ammonia concentration observed in the samples. The treated samples showed a lower ammonia concentration as compared to the untreated samples from day to day. The ammonia concentration shows an increase from day to day in both treated and untreated samples.

The data for days 12 and 14 are not graphed. The lower result for the ammonia content of the untreated sample aged 14 days as opposed to the untreated sample aged 12 days may be due to depletion of the urea.

These results derived from the graph show that the urease negative organisms delay the formation of ammonia at the level of human olfactory detection, which is about 20 ppm or 20 µg/g, by about two additional days. In an untreated litter box, this threshold level is reached in two to three days. In the treated litter box, the threshold level is not reached until almost five days.

EXAMPLE 5

It is desirable to determine the effective concentrations of the culture. The culture is more costly than typical litter such as bentonite. Therefore, the cost of adding the culture to untreated litter might influence the price of litter in a substantial fashion. Since cat litter generally is an inexpensive, disposable commodity, it would be desirable know the minimum useful level of the culture.

Six litter boxes were prepared with ten pounds of granular bentonite and culture preparation. The culture preparation was pulverized in a blender and further crushed with a mortar and pestle. A postage scale was used to weigh the culture preparation; for smaller dosages, estimates were done by volume. For example, 0.1% was 1/10th the volume of 1%. One box was used as a control (0% culture preparation). The other boxes were dosed with: 2%, 1%, 0.50%, 0.25%, and 0.10% dried culture preparation. Four cats had free access to the six litter boxes; not all boxes were used each day. Urine sample clumps were scooped daily and placed in labelled, unsealed plastic bags. The unsealed bags were placed in a five gallon bucket. So that each bag was exposed to air, the bucket lid was left ajar. The control samples were kept in a bucket separate from the treated samples to avoid cross contamination of ammonia.

The samples were subjected to the Ammonia Test of Example 1. Bubbling of the peroxide/urine clump sample indicates the presence of ammonia. No bubbling indicated the absence of ammonia. A few tiny bubbles indicated a small amount of ammonia. Many bubbles and swelling of the sample with air bubbles indicated a significant amount of ammonia. The results of the Ammonia Test are reported in Table 5 with the following symbols:

+=foamed

−=no foam.

The Odor Test of Example 1 was conducted by sniffing the sample clumps. The results are reported in Table 5 with odor rated as follows:

−=could not perceive ammonia

+=slight ammonia odor

++=moderate ammonia odor

+++=strong ammonia odor

TABLE 5

AMMONIA AND ODOR TEST RESULTS

| Culture Age of Sample (day) | Control - 0% NH₃ Test | 0% Odor Test | 2% NH₃ Test | 2% Odor Test | 1% NH₃ Test | 1% Odor Test | 0.5% NH₃ Test | 0.5% Odor Test | 0.25% NH₃ Test | 0.25% Odor Test | 0.1% NH₃ Test | 0.1% Odor Test |
|---|---|---|---|---|---|---|---|---|---|---|---|---|
| 1 |   |   |   |   | − | − | − | − |   |   | − | − |
| 2 | + | + |   |   | − | − |   |   |   |   | − | − |
| 3 | + | + | + | − | + | − | + | − | + | − | − | − |
| 4 | + | +++ | + | − | + | − | + | − |   | − | + | − |
| 5 | + | +++ | + | − | + | − |   |   | + | − | − | − |

Blank indicates sample box was not used on that day.

The culture treated samples had a mild, yeasty odor. The fragrance of the culture itself could be detected in the samples having the higher dosages. The data shows the culture preparation to be effective in retarding formation of ammonia down to 0.1%, which was the lowest level tested. After five days, all samples treated with the culture preparation had no ammonia odor. The peroxide test for ammonia, when applied to the treated samples, showed no response on days one and two and a slight response or no response on days 3 to 5.

It is believed that a smectite clay mineral with sodium as the dominant cation associated with the exchange sites of the smectite, is especially suited to serve as a buffer means for pH control in a clumpable pet litter. Sodium montmorillonite, also known as sodium bentonite or Wyoming bentonite, is a readily available and widely accepted example of such a smectite clay. Other suitable buffer systems might employ mixtures of salts and acids of carbonate, phosphate or borate anions. When liquid is imbibed by the pet litter to form a clump, the sodium smectite or other buffer means additives will create a pH greater than 7 and approximately pH of 9 for optimum effect.

A solution that contains a weak acid or base plus the salt of that acid or base is known as a buffer. Buffer mixtures regulate the pH of an aqueous solution so that, when acid or base is added to the system, there is only a small change in the pH of the system.

In the combination of clumping pet litter and dried urease negative bacterial enzyme culture additive, the sodium bentonite provides a desirable buffer property to pet litter in addition to its clumping property when exposed to acidic pet urine. The buffering effect of sodium smectite clays or inorganic carbonate, phosphate and borate buffer additives maintains a neutral or basic pH in the urine clump. The basic pH of the urine clump provides the appropriate conditions to favor growth of the urease negative bacterial enzyme culture additive and to inhibit the growth of urease positive bacteria from the environment.

EXAMPLE 6

In order to determine buffering action of pet litter, three pet litter materials were evaluated for pH over seven days of use by three cats. The first product was pure sodium bentonite. The second was commercially available Scoop Away litter, a product of A&M Products. The composition of Scoop Away is about 50% sodium bentonite and 50% other clays and chemical additives. The third was commercially available Fresh Step litter, a product of Clorox Corporation. Fresh Step is known to contain attapulgite clay and may contain fuller's earth, as well. Each of these three materials was tested in both untreated and treated versions. The treated materials contained 0.5% by weight of the culture preparation. The six samples were tested for pH both when the samples were gathered and after the gathered samples were aged over a time period ranging from zero days to six additional days. The pH of a control sample of each material, which was not used by the cats, was measured initially to determine a base reading and was evaluated again after six days aging.

TABLE 6 pH OF PET LITTER OVER SEVEN DAY PERIOD

| Sample Day | Sodium Bentonite | Treated Sodium Bentonite | Scoop Away | Treated Scoop Away | Fresh Step | Treated Fresh Step |
|---|---|---|---|---|---|---|
| Control - fresh | 9 | 9 | 7.5 | 7 | 8.5 | 8.5 |
| Control - 6 days | 9 | 9 | 7.5 | 7 | 8.5 | 8.5 |
| Day 0 - fresh | 8 | 8.5 | 7.5 | 8.5 | 8.5 | 8.5 |
| Day 0 - aged | 8 | 8.5 | 7.5 | 8 | 8.5 | 8.5 |
| Day 1 - fresh | 8 | 8.5 | 7 | 7.5 | 9 | 8.5 |
| Day 1 - aged | 7.5 | 8.5 | 7 | 8 | 8 | 8.5 |
| Day 2 - fresh | 8 | 8.5 | 8 | 9 | 8.5 |   |
| Day 2 - aged | 8 | 8.5 | 8.5 | 8 | 8.5 |   |
| Day 3 - fresh |   | 9 | 7 | 7.5 | 8 |   |
| Day 3 - aged |   | 8 | 7 | 7 | 8 |   |
| Day 4 - fresh | 8.5 |   | 7 | 7.5 |   |   |
| Day 4 - aged | 8.5 |   | 7 | 7 |   |   |
| Day 5 - fresh | 8.5 |   |   | 8.5 |   | 8 |

TABLE 6-continued pH OF PET LITTER OVER SEVEN DAY PERIOD

| Sample Day | Sodium Bentonite | Treated Sodium Bentonite | Scoop Away | Treated Scoop Away | Fresh Step | Treated Fresh Step |
| --- | --- | --- | --- | --- | --- | --- |
| Day 5 - aged | 8 | | | 7.5 | | 8 |
| Day 6 - fresh | | | | | | 8 |
| Day 6 - aged | | | | | | 8 |

On days showing a blank, the particular sample was not used.

The test results show that sodium bentonite was the most alkaline control material, with pH 9. Fresh exposure to cat urine caused a drop in the pH of untreated sodium bentonite to either pH 8 or pH 8.5. With age, the samples showed very little change. In two cases the sample pH dropped slightly. Buffering appeared to be effective and the pH stabilized in the range from 7–9. The treated sample of sodium bentonite showed relatively less pH drop and remained relatively more stable, indicating a better buffering action.

Untreated Scoop Away had a lower control pH of 7.5. Fresh exposure to cat urine caused mixed results, with some samples showing a pH drop and another showing a rise. Sample aging had substantially no effect on pH, except that the sample with initial higher pH rose a bit with age. Treated Scoop Away started with a still lower control pH of 7. It showed both increases and decreases in pH with both fresh and aged exposure to cat urine. Buffering appeared to be effective and pH remained in the range from 7–9 in all samples.

Both treated and untreated control samples of Fresh Step had an intermediate control pH of 8.5. With fresh exposure to cat urine, both samples of Fresh Step had a stable pH that changed only slightly, if at all, from the control value. All samples of all three pet litters maintained pH in the range from 7–9 throughout the tests, which established that the buffering action of the smectite clay is sufficient to maintain the pet litter in the desired pH range at least through the effective period of the culture.

The preferential growth of urease negative bacteria inhibits the bacterial conversion of urea to ammonia by urease positive bacteria from the environment. Ammonia is the major odor component of the urine clump. If the pH of the urine clump becomes acidic, urease positive bacteria can grow and will generate ammonia from urea with a consequent odor. The buffer and urease negative bacteria culture stabilizes the urea for approximately three extra days, to a total of about five days, until urease positive bacteria eventually invade the urine clump and begin generation of ammonia and odor.

EXAMPLE 7

An improved culture and preparation method were devised in order to increase the fineness of the culture preparation and to eliminate grinding of the culture preparation. According to the procedures of Example 1, the urease negative cultures were grown in liquid medium, reconstituted from dry form at 12.0% solids level and heat treated at 180° F. by holding for 45 minutes. Then the medium was cooled to 90° F. and was incubated with previously transferred urease negative cultures. The medium was incubated until pH dropped to 5.2. At this stage, it was neutralized to pH 7.0 and the culture was allowed to incubate further. The neutralization steps were continued until pH no longer dropped, indicating the depletion of nutrients. At this stage 10 pounds of sterile mixed 25% dextrose and 10% autolyzed yeast extract solution was added for every 1000 pounds of liquid medium, and the incubation was further continued until pH dropped towards 5.0. This last step was introduced to further enhance cell growth. Then, the culture was cooled to 60° F. and neutralized to pH 7.0 using a 50% solution of sodium hydroxide.

The culture thus prepared was added to granular silica at the preferred rate of 25% weight/weight, with a range from 10 to 50%. The culture, added to silica, was dried at ambient temperature. After the culture was dried, powdered carbonate salts, for example sodium bicarbonate, were added to the dried silica and culture at the preferred rate of 20% by weight, with a range from 10 to 40%. The culture plus carbonate mix was uniformly blended and was used to inoculate bentonite at the rate of 0.1 to 0.25% by weight, for use as animal litter.

The improved culture preparation of this example, prepared according to this new method, does not require grinding and worked efficiently. The following table evaluates the performance of this improved culture preparation in comparison to the original culture preparation of Example 1. The improved culture preparation is referred to in the table as "new culture preparation."

Tests were run using Dr. Elsey's brand scoopable litter, a 6×20 mesh sodium bentonite from Black Hills Bentonite. Dosage was 0.2 percent or one level tablespoon (0.6 ounces) in 18 pounds of litter. After seven days, both the control and the original formulation had a strong ammonia odor and foamed vigorously in the qualitative ammonia test of Example 2. The improved culture had a mild, yeasty smell and no foam.

TABLE 7

ORIGINAL VERSUS NEW CULTURE PREPARATION AMMONIA AND ODOR TEST RESULTS

| Culture Age of Sample (day) | Control - 0% Culture Preparation Foam ($NH_3$) | Odor | 0.2% Original Culture Preparation Foam ($NH_3$) | Odor | 0.2% New Culture Preparation Foam ($NH_3$) | Odor |
|---|---|---|---|---|---|---|
| 1 | + | + | − | − | − | − |
| 2 | + | + | − | − | − | − |
| 3 | | | | | | |
| 4 | | | | | | |
| 5 | +++ | +++ | +++ | +++ | − | − |
| 6 | +++ | +++ | +++ | +++ | − | − |
| 7 | +++ | +++ | +++ | +++ | − | − |

Blank indicates sample box was not used on that day.
− = no ammonia/odor
+ = slight ammonia/odor
++ = moderate ammonia/odor
+++ = strong ammonia/odor The foregoing is considered as illustrative only of the principles of the invention. Further, since numerous modifications and changes will readily occur to those skilled in the art, it is not desired to limit the invention to the exact formulation and operation described, and accordingly all suitable modifications and equivalents may be regarded as falling within the scope of the invention as defined by the claims that follow.

I claim:

1. A method of suppressing production of odor from animal wastes in pet litter, comprising:

first, mixing urease negative bacteria with granular silica; and second, applying to pet litter an effective amount of the mixed urease negative bacteria and silica.

2. A method of suppressing production of odor from animal wastes in pet litter, comprising:

first, providing a culture preparation containing urease negative bacteria, bacterial growth medium and bacterial growth by-products;

second, mixing said culture preparation with granular silica; and third, applying to pet litter an effective amount of the mixed culture preparation and silica.

3. The method of claim 2, wherein said culture preparation comprises from about 10 to 50 weight percent of said granular silica.

4. The method of claim 2, further comprising, before applying the culture preparation to pet liner, adding a carbonate salt to said mixture of preparation and silica.

5. The method of claim 4, wherein said carbonate salt comprises sodium bicarbonate.

6. The method of claim 4, wherein said carbonate salt comprises from about 10 to 40 weight percent of said mixture of culture preparation and silica.

7. An odor retarding pet litter, comprising:

an absorbent composition; and a decomposition retarding urease negative bacteria combined with said absorbent composition in an effective amount to inhibit growth of urease positive bacteria when, in use, the absorbent composition is contacted with animal waste;

wherein, said urease negative bacteria is carried by a granular silica.

8. The pet litter of claim 7, further comprising growth medium of culturing said urease negative bacteria.

9. The pet litter of claim 8, wherein said growth medium is carried on said granular silica.

10. The pet litter of claim 9, further comprising a carbonate salt.

11. The pet litter of claim 10, wherein said carbonate salt comprises from 10 to 40 weight percent of said silica, growth medium, and urease negative bacteria.

12. The pet litter of claim 7, further comprising growth by-products of culturing said urease negative bacteria.

13. The pet litter of claim 12, wherein said buffer means is selected from the group consisting of mixtures of salts and acids of carbonate, phosphate or borate anions.

14. The pet litter of claim 7, further comprising buffer means for maintaining pH in the neutral or basic range when, in use, said absorbent composition is contacted by acidic animal waste.

15. The pet litter of claim 14, wherein said buffer means comprises a sodium smectite clay.

16. The pet litter of claim 7, wherein said absorbent composition comprises a smectite clay.

17. The pet litter of claim 7, wherein said absorbent composition comprises a swelling sodium smectite clay.

18. The pet litter of claim 7, wherein said absorbent composition comprises bentonite.

19. The pet litter of claim 7, wherein said absorbent composition comprises granular sodium bentonite.

* * * * *